United States Patent [19]

Spatz et al.

[11] Patent Number: 4,939,906
[45] Date of Patent: Jul. 10, 1990

[54] MULTI-STAGE BOILER/REGENERATOR FOR LIQUID DESICCANT DEHUMIDIFIERS

[75] Inventors: Mark W. Spatz, Nashua, N.H.; John J. Tandler, Arlington, Va.

[73] Assignee: Gas Research Institute, Chicago, Ill.

[21] Appl. No.: 364,203

[22] Filed: Jun. 9, 1989

[51] Int. Cl.⁵ ............................................. F25D 17/06
[52] U.S. Cl. ........................................ 62/94; 62/271
[58] Field of Search .................................... 62/94, 271

[56] References Cited

U.S. PATENT DOCUMENTS

| 2,690,656 | 10/1954 | Cummings. | |
|---|---|---|---|
| 2,926,502 | 3/1960 | Munters et al. | |
| 2,968,165 | 1/1961 | Norback | 62/94 |
| 3,009,331 | 11/1961 | Hewett et al. | 62/176 |
| 3,417,574 | 12/1968 | Kelley | 62/94 X |
| 4,164,125 | 8/1979 | Griffiths | 62/271 |
| 4,171,624 | 10/1979 | Meckler et al. | 62/271 |
| 4,197,714 | 4/1980 | Bradshaw | 62/94 |
| 4,205,529 | 6/1980 | Ko | 62/271 |
| 4,259,849 | 4/1981 | Griffiths | 62/271 |
| 4,430,864 | 2/1984 | Mathiprakasam | 62/94 |
| 4,454,727 | 6/1984 | Suzuki | 62/235.1 |
| 4,474,021 | 10/1984 | Harband | 62/94 |
| 4,527,398 | 7/1985 | Schaetzle | 52/94 |
| 4,635,446 | 1/1987 | Meckler | 62/271 |
| 4,860,548 | 8/1989 | Ryham | 62/94 |
| 4,864,830 | 9/1989 | Ryham | 62/94 |

Primary Examiner—Lloyd L. King
Attorney, Agent, or Firm—Lorusso & Loud

[57] ABSTRACT

An improved method and apparatus for regenerating aqueous desiccants for use in an air conditioning system are disclosed. The disclosed method and apparatus utilizes a gas-fired desiccant boiler and a combined desiccant regenerator/interchange heat exchaner. The combined regenerator/heat exchanger utilizes steam produced from the boiler to provide heat for partial regeneration. The desiccant boiler has a liquid/vapor separator chamber and thermosyphon recirculation to reduce scale and corrosion of the boiler.

11 Claims, 4 Drawing Sheets

MULTI-STAGE BOILER/REGENERATOR FOR LIQUID DESICCANT DEHUMIDIFIERS

BACKGROUND OF THE INVENTION

This invention relates to air conditioning systems utilizing liquid desiccants for dehumidifying air and more specifically to an air conditioning system providing improved regeneration of liquid desiccants.

Devices that use hygroscopic liquids such as lithium chloride (LiCl) or calcium chloride ($CaCl_2$) solutions to dehumidify air have been known for many years. However, the use of these systems has been limited to specialized applications due to the problem of regenerating the liquid desiccant. Regeneration usually requires heating the desiccant to drive off the excess moisture or contacting the desiccant with a hot gas which absorbs the excess moisture. Generally, air regenerators are used to regenerate the desiccant. These regenerators are costly to run especially where waste heat is not available, as in residential applications. Boiler-type regenerators may also be expensive, requiring large amounts of corrosion-resistant metals. If pressurized boilers are employed to provide high efficiency, costly components are needed and issues of safety become more complex.

SUMMARY OF THE INVENTION

The present invention overcomes the above-mentioned problems by providing an air conditioning system, having a novel desiccant boiler and a combined desiccant regenerator and interchange heat exchanger to produce an effective, economic liquid desiccant regeneration system. The term "air conditioning system" as used herein refers to apparatus which dehumidifies air and may also provide cooling.

Regeneration of the liquid desiccant is accomplished by diverting a portion of the desiccant flowing through a desiccant conditioner and heating the desiccant successively in an interchange heat exchanger, an air desiccant regenerator, a second interchange heat exchanger (or higher temperature portion of a single interchange heat exchanger), and a boiler. The heat is provided from concentrated desiccant flowing back to the desiccant conditioner, from ambient air heated from condensing steam provided from the boiler, and from energy furnished to the boiler by, for example, combustion products of a natural gas-fueled burner.

In a preferred embodiment, several heat exchange subsystems are combined into a single desiccant regenerator/interchange heat exchanger unit. The combined unit preferably formed by alternately stacking two different plates, reduces pumping requirements and permits a compact air conditioning system while preserving efficient use of available heat for regeneration of the liquid desiccant.

The liquid desiccant air conditioning system of the invention also preferably includes a unique gas-fueled boiler employed as the final heating stage in removing water from and concentrating the liquid desiccant. The boiler, which preferably includes multiple finned tubes over which are directed combustion products of a natural gas-fueled burner, maintains cool wall temperatures by employing natural circulation-that is, the difference in density of the fluid in several "fired" tubes and the liquid in the "unfired" tubes drives water vapor and desiccant solution in the "fired" tubes up into a top manifold which operates as a liquid/vapor separator. Liquid desiccant flows down the "unfired" tubes and water vapor exits at the top through a vent. A portion of the circulating liquid desiccant that has been concentrated leaves at the bottom of the separator.

This concentrated liquid desiccant is shunted through the combined interchange heat exchanger to raise the temperature of the incoming dilute desiccant and lower its temperature. The cool concentrated desiccant is returned to the air conditioner. The steam vented in the boiler is used to partially regenerate the weak desiccant.

It is an object of the present invention to provide a liquid desiccant-based air conditioning system with improved regeneration of the liquid desiccant.

Another object of the invention is to utilize effectively the heat provided to a boiler to regenerate a liquid desiccant, including utilizing latent heat in the water vapor generated in the boiler.

Still another object of the invention is to provide an improved liquid desiccant boiler/separator operable at atmospheric pressure and with natural (thermosyphon), recirculation.

Yet another object of the invention is to provide staged regeneration of a liquid desiccant with multiple heat exchange and desiccant regeneration steps performed in a single combined unit.

These and other features and objects of the present invention will become apparent from the drawings and detailed description of the invention which follows.

DESCRIPTION OF PREFERRED EMBODIMENTS

The present invention provides an efficient and economic means to regenerate or concentrate aqueous desiccants which are used in an air conditioning system employed for dehumidification and, optionally, cooling. A multistage regeneration process is used to recondition liquid desiccant. A boiler is used to heat the spent liquid desiccant to remove the moisture as steam. Most of the energy from the steam is extracted through a combined regenerator heat exchanger which heats and partially regenerates the diluted desiccant prior to its entry into the boiler and cools the regenerated desiccant on its return for reuse in drying air.

Figure 1:
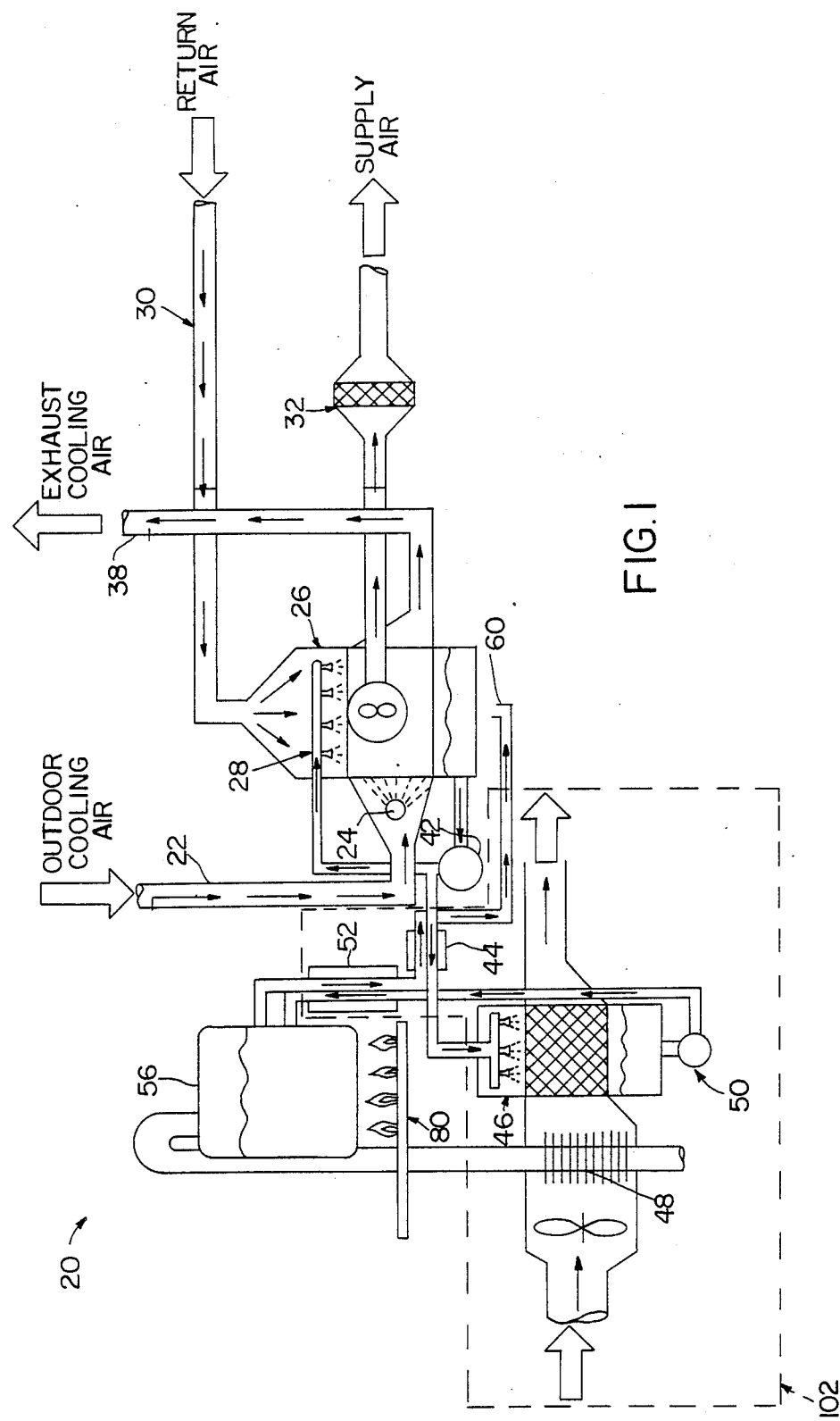
FIG. 1 shows a liquid desiccant air conditioning system according to the invention.

FIG. 1 is a schematic diagram of an embodiment of a liquid desiccant air conditioning system 20 of the invention. The several elements of the system 20 will now be described with reference to its operation.

Outdoor air, drawn through an inlet duct 22, is evaporatively cooled by a water spray 24. This cooled air is directed to a desiccant conditioner 26 to which return air is also directed through a duct 30. In the desiccant conditioner 26, the return air is contacted with a liquid desiccant solution from a sprayer 28, removing water from the air. Lithium chloride (LiCl) or calcium chloride (CaCl$_2$) are typical of liquid desiccant solutions but other liquid desiccants may be employed. The dehumidified air can be used directly as supply air to the space to be dehumidified or it can first be sensibly cooled through an evaporative cooler 32 or similar device. The evaporative cooler 32 provides sensible cooling to the supply air. The outdoor cooling air is exhausted from the conditioner 26 through an exhaust duct 38.

As the desiccant dehumidifies the air stream, the moisture-absorbing capability of the desiccant is lessened and it must be regenerated. A portion of the dilute desiccant from the conditioner 26 is passed by a pump 42 to a first interchange heat exchanger 44 where the temperature of the desiccant is raised. Next, the weakened desiccant is partially concentrated in an air desiccant regenerator 46 in which heated air from a regeneration air heater 48 contacts the liquid desiccant. The desiccant then is forced by a pump 50 through a second interchange heat exchanger 52 and then to a desiccant boiler 56 in which regeneration of the desiccant is completed. The water vapor generated in the desiccant boiler 56 heats the air passing through the regeneration air preheater 48. The interchange heat exchangers 44 and 52 also reduce the temperature of the regenerated desiccant as it returns along a pipe 60 to the conditioner 26.

Figure 2:
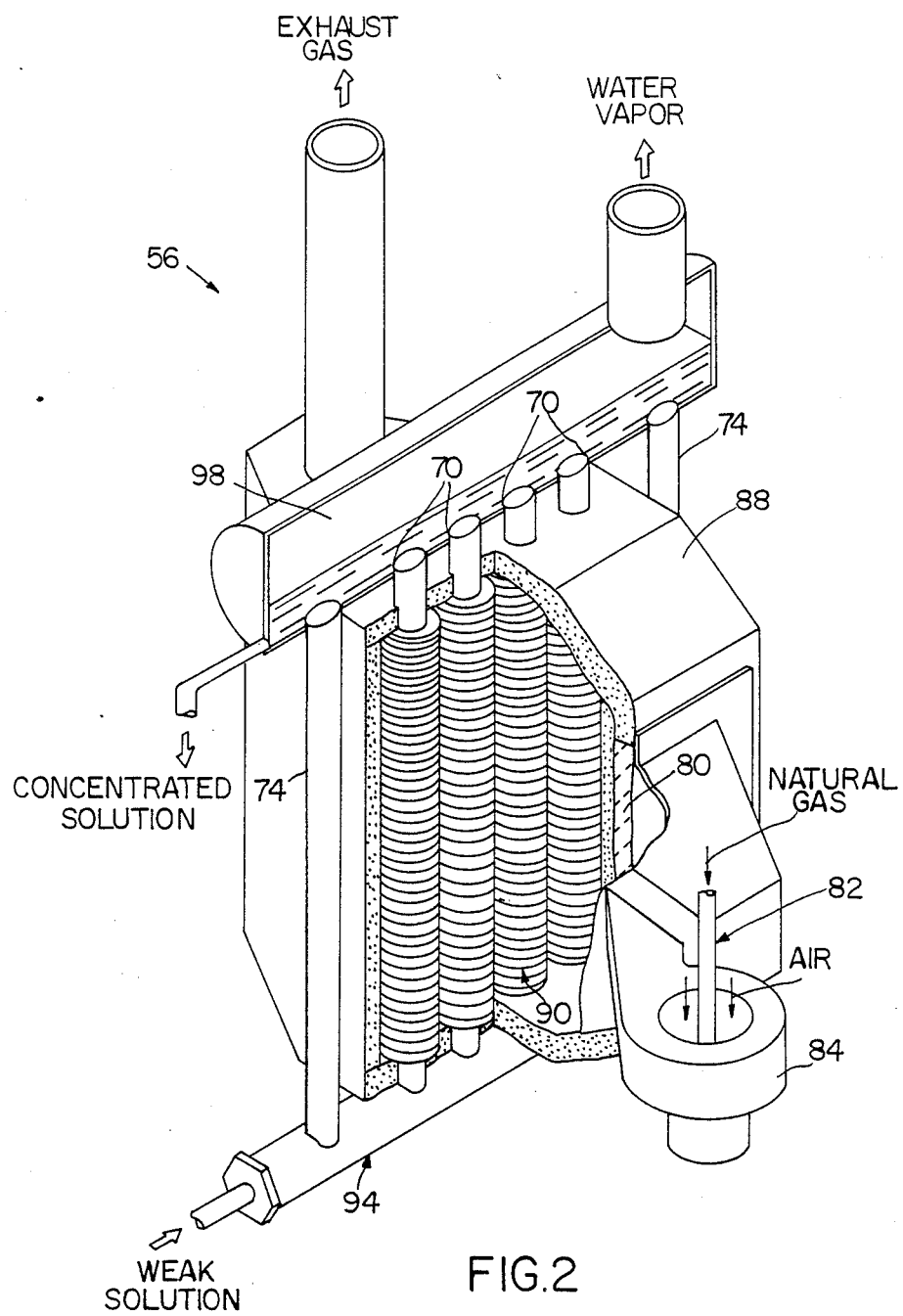
FIG. 2 shows a direct-fired natural circulation desiccant boiler suitable for use in the air conditioning system of the invention.

FIG. 2 illustrates a preferred boiler 56 which may be used to evaporate water from the desiccant during regeneration. The boiler 56 operates on natural circulation, with the density of the fluid (part liquid, part vapor) in the "fired" tubes 70 being less than the density of the liquid in the outer "unfired" tubes 74. This difference creates a thermosyphon effect or natural circulation of fluid in the tubes 70 and 74. In the embodiment shown in FIG. 2, a porous ceramic burner 80, fueled by natural gas, is used essentially as a flame holder for combustion of natural gas supplied through a fuel line 82 and mixed with air in a blower 84. The hot combustion gases are blown through a combustion chamber formed by a housing 88 enclosing the fired tubes 70, and flow across fins 90 of the fired tubes 70 thereby heating the tubes 70. Weak desiccant pumped into the fired tubes 70 through a manifold 94 connected to their lower ends is heated, and as the desiccant rises in the fired tubes 70, water in the desiccant is vaporized. As the water is vaporized, a density differential is created between the fluid in the fired tubes 70 and the unfired tubes 74 connected between the manifold 94 and a liquid/vapor separator 98 outside the combustion chamber housing 88. This density differential induces a natural flow of desiccant solution up the fired tubes 70 and down the unfired tubes 72. This natural circulation of the desiccant keeps the inside walls of the fired tubes 70 coated with desiccant, which reduces or prevents "hot spots" from forming on the inside of the fired tubes 70. Thus corrosion and scale build-up in the fired tubes 70 are reduced.

The liquid/vapor separator 98 at the top of the boiler 56 operates to separate water vapor from the concentrated liquid desiccant. A portion of the concentrated desiccant is withdrawn from the bottom of the liquid/vapor separator 98 for return to the desiccant conditioner 26 (see FIG. 1). Water vapor flows out the top of the liquid/vapor separator 98 and is subsequently condensed to heat air for use in an earlier regeneration step as discussed in more detail hereinafter with reference to FIGS. 3 and 4.

Figure 3:
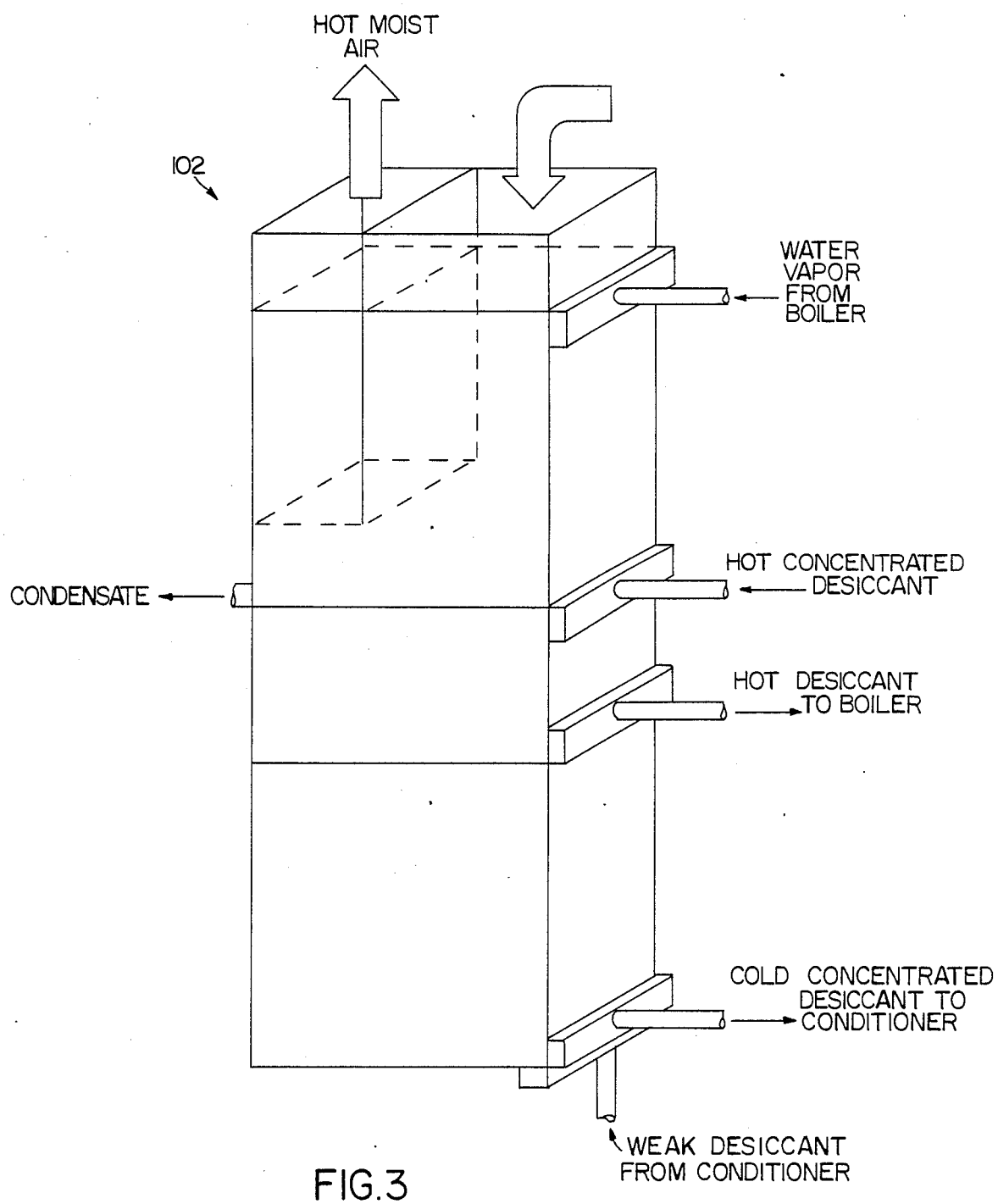
FIG. 3 shows a combined desiccant regenerator and interchanger heat exchanger incorporating several of the elements of the system illustrated in FIG. 1.
Figure 4:
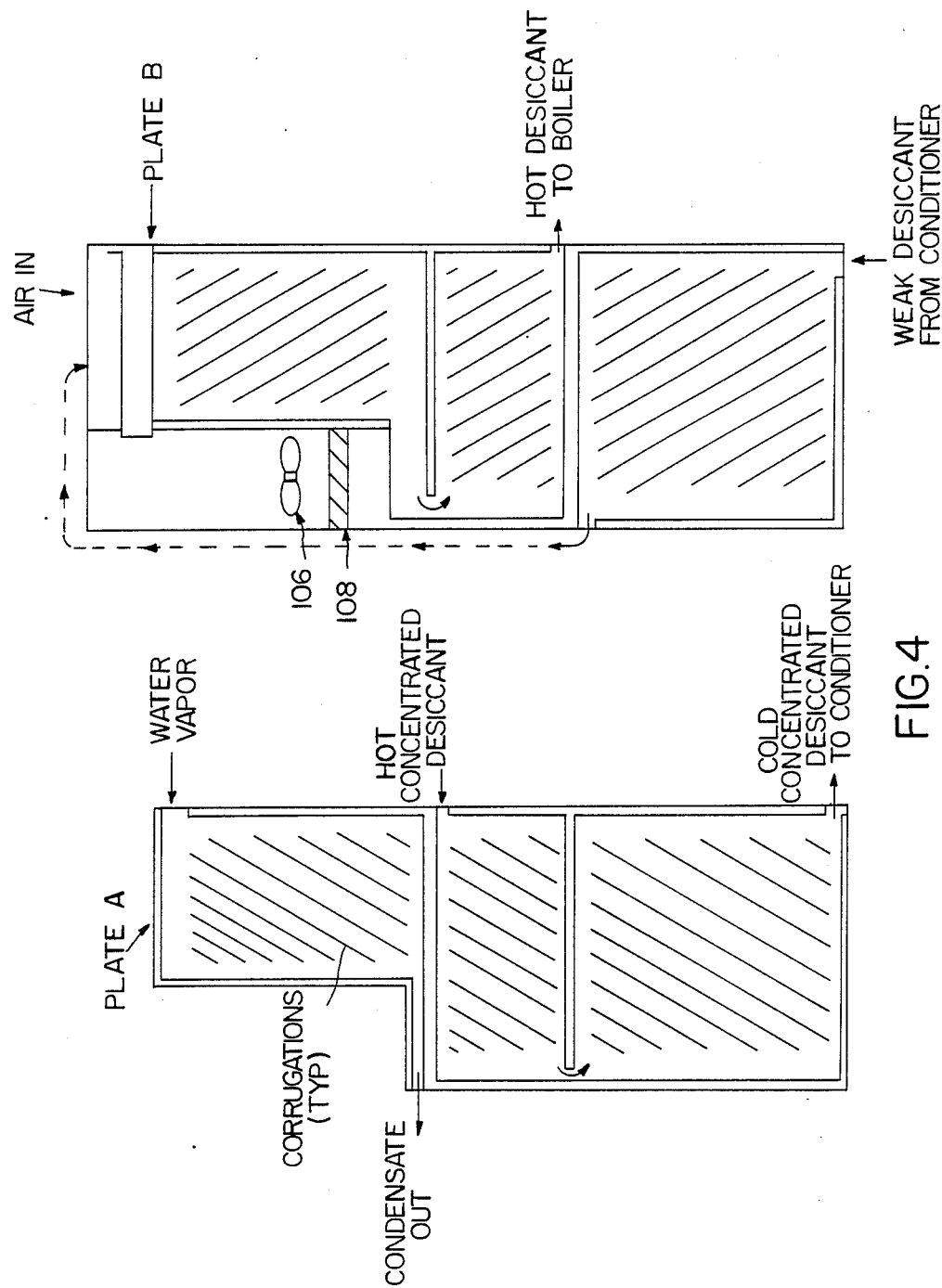
FIG. 4 shows alternating plates used in construction of the combined desiccant regenerator and interchange heat exchanger of FIG. 3.

In the combined regenerator and interchange heat exchanger illustrated in FIGS. 3 and 4, four components shown in FIG. 1, namely the two interchange heat exchangers 44 and 52, the desiccant regenerator 46 and the regeneration air heater 48, are combined into a single component. This component is best understood by reference to FIGS. 3 and 4. The combined desiccant regenerator/interchange heat exchanger 102 is constructed by alternately stacking two different corrugated plates (shown in FIG. 4) to form alternating flow channels. As shown in FIGS. 3 and 4, water vapor or steam from the desiccant boiler 56 is introduced near the top of the regenerator/exchanger 102, in alternate channels (see plate A). The water vapor condenses, transferring heat to air and weak desiccant entering adjacent channels near the top of the regenerator/heat exchanger 102 (see plate B). The upper portion of each plate corresponds to the desiccant regenerator 46 and regeneration air heater 48 of FIG. 1. As the water vapor condenses the weak desiccant and air mixture is heated and the desiccant is partially regenerated. Warm air and moisture are exhausted by a fan 106 to the outdoors. An entrainer 108 is provided to prevent desiccant from escaping the combined regenerator/exchanger 102. As the partially regenerated desiccant flows into the middle of a channel plate B, it is further heated by the hot concentrated desiccant removed from the liquid/vapor separator 98. Hot concentrated desiccant from the boiler 56 is introduced at the middle of plate A while the partially regenerated desiccant which has been heated is removed from the middle of plate B. The partially regenerated desiccant is pumped to the desiccant boiler 56. The middle section of plate A and plate B corresponds to the interchange heat exchanger 52 shown in FIG. 1. Diluted desiccant from the regenerator/heat exchanger 102 is introduced at the bottom of plate A and is heated by the hot desiccant from the boiler 56 which has been partially cooled from traveling through the center portion of plate A. The heated dilute desiccant from the regenerator/heat exchanger 102 is removed from the center of plate B and pumped to the top of plate B. The lower portions of plate A and plate B correspond to the interchange heat exchanger 44 shown in FIG. 1.

In the combined desiccant regenerator and interchange heat exchanger approximately 20-30 plates are stacked together to produce the component 102 shown in FIG. 3. An important feature of this combined desiccant regenerator/heat exchanger 102 is that the heat transfer is accomplished at near atmospheric pressure. This reduces fabrication costs. In a preferred embodiment the plates are produced from a polymer such as polysulfone and are connected by an adhesive such as epoxy.

While the foregoing invention has been described with reference to its preferred embodiments, various alterations and modifications will occur to those skilled in the art. For example, materials other than high temperature polymers such as metal can be used to fabricate the combined desiccant regenerator/heat exchanger. Various liquid desiccant solutions can be used with the present system. These and other such alterations and modifications are intended to fall within the scope of the appended claims.

What is claimed is:

1. A process for regenerating liquid desiccant used in an air-conditioner comprising:

providing (a) a first and a second heat exchanger each accommodating a flow of liquid desiccant therethrough for transferring sensible energy, (b) a desiccant regenerator and, (c) a desiccant boiler;

removing diluted desiccant from the air conditioner and routing the desiccant through said first heat exchanger so that the temperature of the desiccant is raised, routing the diluted desiccant from said first heat exchanger to said desiccant regenerator wherein the diluted desiccant is partially regenerated, routing the partially regenerated desiccant through said second heat exchanger so that the temperature of the desiccant is raised, routing said partially regenerated desiccant through said desiccant boiler where said desiccant is fully regenerated with moisture from said desiccant being vaporized, routing the regenerated desiccant through said second heat exchanger to lower the temperature of said desiccant, routing said regenerated desiccant through said first heat exchanger to lower the temperature of said desiccant, returning said regenerated desiccant to the air conditioner; and routing the vaporized moisture from said desiccant boiler to said desiccant regenerator to supply energy so that the diluted desiccant is partially regenerated.

2. A liquid desiccant regeneration system for use in an air conditioner comprising:

first and second heat exchangers constructed such that sensible heat is transferred from concentrated desiccant to diluted desiccant;

a desiccant regenerator for partially regenerating the liquid desiccant;

a desiccant boiler for completing the regeneration of the liquid desiccant and vaporizing moisture absorbed in the desiccant;

means for directing diluted desiccant through said first heat exchanger and into said desiccant regenerator;

means for removing liquid desiccant from said desiccant regenerator and pumping liquid desiccant through said second heat exchanger and into said desiccant boiler;

means for removing liquid desiccant from said desiccant boiler and passing liquid desiccant through said second heat exchanger and said first heat exchanger; and means for passing the vaporized moisture through said desiccant regenerator so that the vaporized moisture is condensed and transfers heat to the liquid desiccant.

3. The liquid desiccant regeneration system according to claim 2 wherein said desiccant boiler comprises: inlet means for said liquid desiccant;

a plurality of generally vertical finned tubes connected to said inlet means;

at least one generally vertical down comer tube connected to said inlet means;

burner means positioned so that hot gases produced from said burner means heats said plurality of finned tubes;

a liquid/vapor separator connected to the top of said plurality of finned tubes and to the top of said at least one down comer tube;

a desiccant outlet connected to a bottom of said liquid/vapor separator;

a vapor outlet connected to a top of said liquid/vapor separator;

said desiccant boiler being operable to heat liquid desiccant as it flows upward through said finned tubes and downward through said at least one down comer tube, to vaporize moisture from said desiccant and remove said moisture through said vapor outlet means, and to remove regenerated desiccant through said desiccant outlet.

4. The liquid desiccant regeneration system according to claim 2 wherein said first and second heat exchangers and said desiccant regenerator are combined into one component comprising;

a housing;

a plurality of a first plates having a first flow channel for routing the vaporized moisture that is produced from said desiccant boiler from the top of said first plate and out the middle of said first plate, a second flow channel for routing the hot desiccant from the desiccant boiler from the middle of said first plate to the bottom of said first plate;

a plurality of a second plates having a first flow channel for routing desiccant from the air conditioner from the bottom to the middle of said second plate and having a second flow channel for routing partially heated desiccant from the top of said second plate to an exit at the middle of said second plate, said second channel having a second branch which exhausts air and moisture at the middle of said second plate;

said plurality of first and second plates being stacked alternately in a sealingly engaged manner and being surrounded by said housing.

5. The liquid desiccant regeneration system according to claim 4 wherein said channels of said first plate and said second plate are formed by corrugations on said first plate and said second plates.

6. The liquid desiccant regeneration system according to claim 4 wherein said plurality of said first and second plates are made of polysulfone.

7. A liquid desiccant system for use in an air conditioner comprising:

a desiccant boiler for regenerating liquid desiccant and vaporizing the moisture absorbed by the desiccant;

a combined regenerator heat exchanger having a first flow channel for routing vaporized moisture, a second flow channel for routing hot desiccant from said boiler, a third flow channel for routing diluted desiccant from the air conditioner and a fourth channel for routing partially heated desiccant, said fourth channel having a first exit for air and water vapor and a second exit for desiccant;

means for removing the liquid desiccant from the air conditioner system and pumping the liquid desiccant through said third flow channel;

means for removing liquid desiccant from said third channel and routing it to said fourth channel;

piping means for routing the liquid desiccant from the fourth channel to the boiler;

piping means for routing the regenerated liquid desiccant from the boiler to said second flow channel;

piping means for routing the vaporized moisture from the boiler to said first flow channel;

piping means for routing the regenerated liquid desiccant from the second flow channel to the air conditioner.

8. The liquid desiccant regeneration system according to claim 7 wherein said combined regenerator/heatexchanger comprises:
   a housing;
   a plurality of first plates having said first flow channel for routing the vaporized moisture produced from a boiler and having said second flow channel for routing hot desiccant from the boiler;
   a plurality of second plates having said third flow channel for routing the dilute desiccant from the air conditioner and having said fourth channel, a first exit for air and water vapor, and a second exit for the desiccant;
   said plurality of first and second plates being stacked alternately in a sealingly engaged manner and being surrounded by said housing.

9. The liquid desiccant system according to claim 7 wherein said desiccant boiler comprises:
   inlet means for said liquid desiccant;
   a plurality of generally vertical finned tubes connected to said inlet means;
   at least one generally vertical down comber tube connected to said inlet means;
   burner means positioned so that hot gases produced from said burner means heats said plurality of finned tubes;
   a liquid/vapor separator connected to a top of said plurality of finned tubes and to the top of said at least one down comber tube; and
   a desiccant outlet means connected to the bottom of said liquid/vapor separator;
   said desiccant boiler being operable to heat liquid desiccant as it flows upward through said finned tubes and downward through said at least one down comber tube, to vaporize moisture from said desiccant and remove said moisture through said vapor outlet means, and to remove regenerated desiccant through said desiccant outlet means.

10. The liquid desiccant regeneration system according to claim 8 wherein said channels of said plurality of first and second plates are formed by corrugations on said first and second plates.

11. The liquid desiccant regeneration system according to claim 8 wherein said plurality of first and second plates are made of polysulfone.

* * * * *